Nov. 29, 1966 R. H. COCHRANE 3,288,013
ROTATABLY DRIVEN APPARATUS FOR PRODUCING PARALLEL
MOVEMENT OF COOPERATING BLADES
Filed May 26, 1965 2 Sheets-Sheet 1

INVENTOR
RICHARD H. COCHRANE

BY
*Morsell & Morsell*
ATTORNEYS

Nov. 29, 1966    R. H. COCHRANE    3,288,013
ROTATABLY DRIVEN APPARATUS FOR PRODUCING PARALLEL
MOVEMENT OF COOPERATING BLADES
Filed May 26, 1965    2 Sheets-Sheet 2

INVENTOR
RICHARD H. COCHRANE

BY
Morsell & Morsell
ATTORNEYS

United States Patent Office 3,288,013
Patented Nov. 29, 1966

3,288,013
ROTATABLY DRIVEN APPARATUS FOR PRODUCING PARALLEL MOVEMENT OF COOPERATING BLADES
Richard H. Cochrane, Milwaukee, Wis., assignor to Pratt Manufacturing Corp., Milwaukee, Wis., a corporation of Wisconsin
Filed May 26, 1965, Ser. No. 458,978
5 Claims. (Cl. 83—328)

This invention relates to improvements in rotatably driven apparatus for producing parallel movement of cooperating blades and, more particularly, blades for use in cutting or sealing packaging material between relatively bulky items.

In the packaging of various items with sheet material such as polyethylene it is frequently necessary to effect a cut-off between packaged items, to heat seal between such items, or to perform both operations. In automatic packaging machinery it is desirable to be able to perform such operations by rotary members but, in certain situations, problems are encountered. When bulky items such as bulky surgical dressings are being fed to the mechanism, if shear blades or sealing blades are mounted on the peripheries of cooperating rotary members, there is difficulty in preventing the blades from engaging bulky portions of the items as they are being fed into the bite between the rotary members. This is particularly serious, as such action may cause crushing or other mutilation of the product.

It is a general object of the present invention to provide improved apparatus whereby a rotary drive may be employed to produce parallel movement of cooperating blades mounted on cooperating rotary members, whereby a cut-off or heat seal between relatively bulky items may be effected without difficulty, and without mutilating the product.

A further object of the invention is to provide an improved apparatus wherein shear blades or heat sealing blades are driven by and mounted on rotary members in a novel manner to produce an accurately timed, straight line, parallel movement of the blades.

A more specific object of the invention is to provide apparatus as above described wherein means may be provided, in the case of cooperating shearing knives, for adjusting the angle of engagement of one blade with respect to the other in order to take out any play and to ensure a good shearing engagement.

With the above and other objects in view, the invention consists of the improved rotatably-driven apparatus for producing parallel movement of cooperating blades, and all of its parts and combinations, as set forth in the claims, and all equivalents thereof.

In the accompanying drawings illustrating preferred embodiments of the invention, in which the same reference numerals designate the same parts in all of the views.

Figure 1:
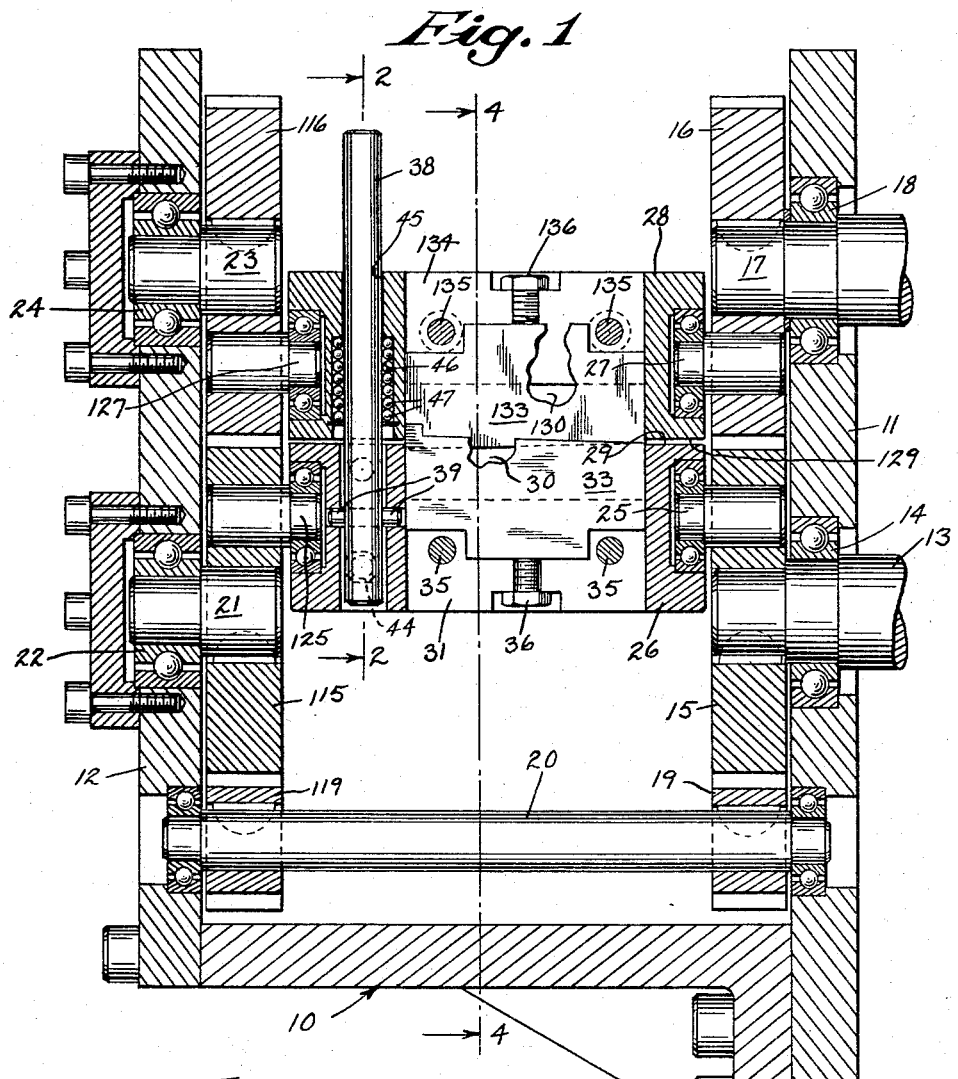
FIG. 1 is a transverse vertical sectional view through the apparatus, parts of the blades being broken away.

Referring more particularly to the drawings, there is a suitable frame 10 having spaced upright supports 11 and 12. A suitably-driven drive shaft 13 is journaled through a bearing 14 in the frame member 11 and has a projecting end to which a gear 15 is keyed. The latter is in mesh with a like gear 16 mounted on a shaft end 17, the latter being journaled in the bearing 18. The gear 15 also drives a small gear 19 on one end of a shaft 20 which is journaled transversely between the frame members 11 and 12. The opposite end of the shaft 20 has a small gear 119 keyed thereto and this in turn drives a gear 115 mounted on a stud shaft 21 which is journaled in a bearing 22 in the frame member 12. The gear 115 in turn drives a gear 116 which is mounted on a stud shaft 23 journaled in a bearing 24 in the frame member 12. The gears 115, 116 and 119 are of identical size with and positioned opposite the gears 15, 16 and 19, respectively.

Projecting toward one another from the gears 15 and 115 are eccentric pins 25 and 125. The axis of these pins travels in the planetary course (a) of FIG. 4 around the axis of the gears 15 and 115 when the latter rotate. Supported on the pin ends 25 and 125 for planetary movement is a lower blade holder 26.

Similar pins 27 and 127 project toward one another from the gears 16 and 116 and are positioned to travel in the planetary path (b) (FIG. 4) when the gears are rotated. These pins support an upper blade holder 28 for planetary movement.

Figure 4:
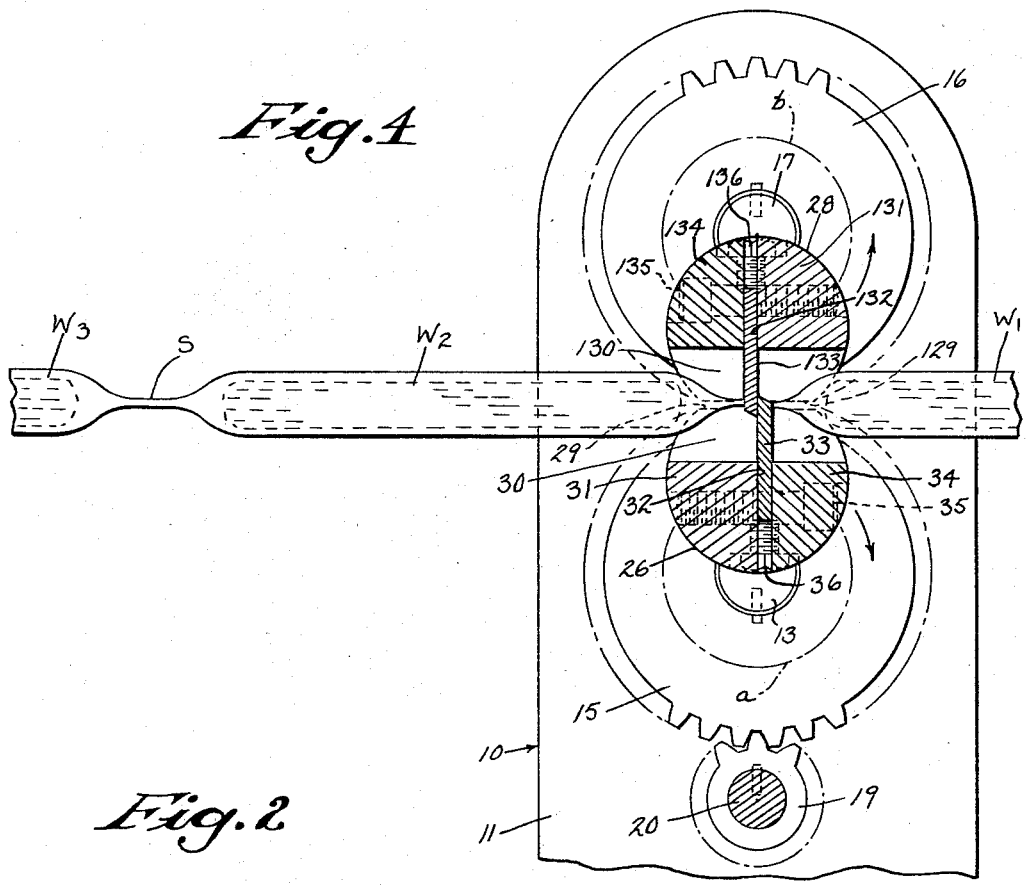
FIG. 4 is a sectional view taken on a line 4—4 of FIG. 1.
Figure 3:
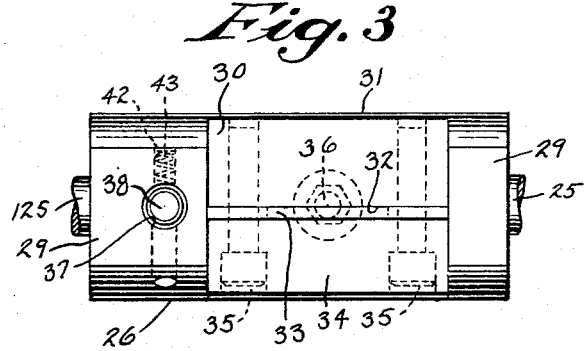
FIG. 3 is a view looking down on the recessed portion of the lower blade holder.

The lower blade holder 26 is best illustrated in FIGS. 3 and 4. It is generally cylindrical, but has a flattened peripheral portion 29 and has a relatively deep package-accommodating recess 30 extending inwardly from the flattened periphery. The blade holder includes a solid segment 31 (see FIG. 4) having a face 32 against which a lower blade 33 is adapted to be clamped. The blade is removably clamped in position by means of a removable segment 34, which is held in clamping position by bolts 35 threaded into the solid segment 31. An adjustment bolt 36 (FIG. 1) is adapted to act on the edge of the blade 33 to adjust the amount of projection of the shearing edge.

Adjacent one end of the lower blade holder 26 is a transverse bore 37 (see FIG. 2) extending inwardly from the flattened periphery 29. This bore loosely receives a lower portion of a guide rod 38, and the latter portion has trunnions 39 projecting from opposite sides, as shown in FIG. 1, which trunnions are aligned with the axis of the pin 125. The bore 37 is larger than the rod 38 to provide a clearance space for tilting of the blade holder on the axis of the trunnions 39, relative to the stem 38.

Figure 2:
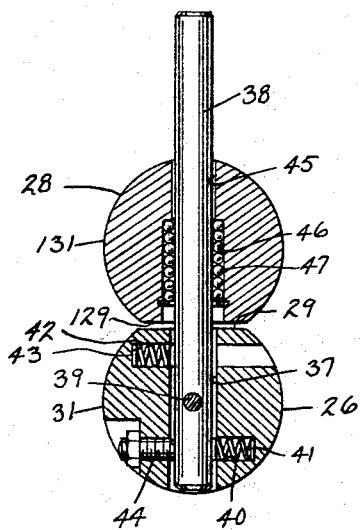
FIG. 2 is a sectional view taken on a line 2—2 of FIG. 1.

Referring now to FIG. 2, the blade holder 26 has a spring pocket 40 for a spring 41 acting on one side of the rod 38 below the trunnions 39, and has another spring pocket 42 for a spring 43 acting on the opposite side of the rod 38 above the trunnions 39. By manipulating an adjustment screw 44 opposite the spring 41 the block 26 may be made to tilt one way or the other with respect to the rod 38 for the purpose of ensuring that the blades are in intimate contact, and for ensuring a good shear when the device is used for shearing.

The upper blade holder 28 is similar to the lower blade holder 26 except that it is oppositely positioned. Referring more particularly to FIG. 4, it will be seen that the upper blade holder has a flattened periphery 129, a package-accommodating recess 130, a solid segment 131 having a blade clamping face 132, a blade 133, a removable segment 134, clamping screws 135, and a blade-adjusting screw 136 which correspond in all respects to the parts 29—36, inclusive, of the lower blade holder. The upper blade holder differs from the lower blade holder in that it is provided with a transverse bore 45 having an enlargement 46 for anti-friction bearing members 47, whereby the upper portion of the rod 38 may slide back and forth in the bore 45 during operation of the apparatus, as will be hereinafter explained.

Figure 5:
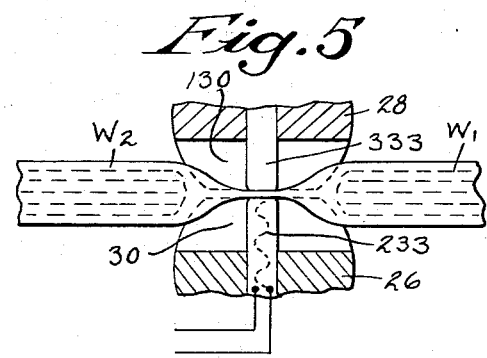
FIG. 5 is a fragmentary sectional view taken in the same location as FIG. 4, showing the apparatus as used for heat sealing.

In FIG. 5 there is illustrated a fragment of the apparatus of FIG. 4 wherein, in lieu of shear blades 33 and 133, there are heat sealing blades 233 and 333. One or both of these blades may have an electric heating element therein whereby, when the blades come in contact as in FIG. 5, a heat seal will be produced between the packaged items. The blade holders of FIG. 5 will vary from the blade holders of FIG. 4 only to the extent necessary to make the blades meet in a straight line instead of in shearing relationship. Furthermore, for heat sealing, the adjustment feature of FIG. 2 will not be necessary.

*Operation*

Referring now to FIG. 4, it will be seen that wrapped surgical dressings $W_1$, $W_2$ and $W_3$ of a relatively bulky type are being suitably fed to the apparatus such as by an endless vacuum belt 50. These wrapped items, as illustrated, are joined together by heat-sealed web sections S. Where the apparatus is used for cut-off purposes, as in FIG. 4, these heat seals have been previously effected by means of mechanism such as is illustrated in FIG. 5, or by any other suitable heat-sealing device.

When the parts are in the position of FIG. 4 the knives 33 and 133 are in shearing engagement to effect a cut-off between the wrapped items $W_1$ and $W_2$, and it will be noted that the wrapped items are accommodated in the recesses 30 and 130 of the blade holders. The severed item $W_1$ will then fall by gravity into a suitable receptacle. With the gears 15 and 115 and 16 and 116 rotating as indicated by the arrows in FIG. 4, the pins 25–125 which support the lower blade holder will travel rapidly away from the pins 27–127 which support the upper blade holder, as the former will follow planetary path (a) and the latter will follow planetary path (b). This will cause a quick opening up of the knives to allow the wrapped item $W_2$ to be advanced through the apparatus to occupy the space formerly occupied by the wrapped item $W_1$ in FIG. 4. During such planetary movement the rod 38 will keep the blade holders facing one another as the pins 25–125 and 27–127 rotate in the bearings in the ends of the blade holders. Thus the blades will open up with a parallel straight line movement while being driven by the rotary gears. After the blade holders have been moved 180° from the position of FIG. 4 they will again start to close, also with a straight line parallel movement and, by the time the item $W_2$ arrives at the position of the item $W_1$ of FIG. 4 to bring another heat-sealed web into position for cut-off, the blades will again arrive in the shearing position of FIG. 4. It is apparent, therefore, that a very simple and foolproof arrangement has been provided for rotatably driving the blades while producing parallel movement thereof, the driving gears for the two blade holders being in mesh to ensure proper timing of the blade action.

If the blades are heat-sealing blades as shown in FIG. 5, the operation will be similar to FIG. 4 except that the ends of the blades will merely abut for the heat-sealing operation.

In the case of the shear knives of FIGS. 1–4, inclusive, it is important to provide means for ensuring that the blades are always in intimate shearing contact. This is taken care of by the novel arrangement illustrated in FIGS. 1 and 2 wherein the lower portion of the stem 38 is provided with the trunnions 39 whereby the lower blade holder may be made to tilt to a small degree relative to the stem under the restraint of the springs 41 and 43. It is also possible to effect an adjustment in one direction or the other by manipulation of the screw 44 to take out play caused by wear and thereby assure a good shearing contact.

With the arrangement of the present invention the drive for the two knives is always geared together so that as the blade holders move in their planetary paths they are always in proper phase with one another.

Because of the straight line parallel movement it is apparent that the knives can enter the space between the wrapped items with a straight line movement transversely of the direction of movement of the wrapped items to perform the cut-off without any danger of damaging the wrapped items.

Various changes and modifications may be made without departing from the spirit of the invention, and all of such changes are contemplated as may come within the scope of the claims.

What I claim is:

1. Apparatus for producing substantially parallel movement of cooperating instruments comprising a first holder, a second holder, an instrument in each of said holders, means including a first gear for causing orbital movement of said first holder in a planetary path around the axis of said first gear, means including a second gear meshing with said first gear for causing orbital movement of said second holder in a planetary path around the axis of said second gear, the instruments being so disposed in the holders and the planetary paths being so related to one another that the instrument of the first holder has operating engagement with the instrument of the second holder each time the holders complete an orbit, a rod projecting from and extending transversely of one of said holders and having slidable engagement with the other holder to maintain the holders in facing relationship with one another during their orbital travel, the holder from which said rod projects being tiltably movable relative to the rod for adjustment purposes, and means for adjustably maintaining a selected position of tiltable movement.

2. Cut-off apparatus comprising a first holder having a transverse bore near one end, a second holder having a transverse bore of larger diameter than the bore of the first holder aligned with the latter, a knife blade in each of said holders, means including a first gear for causing orbital movement of said first holder in a planetary path round the axis of said first gear, means including a second gear meshing with said first gear for causing orbital movement of said second holder in a planetary path around the axis of said second gear, the knife blades being so disposed in the holders and the planetary paths being so related to one another that the knife blade of the first holder has shearing engagement with the knife blade of the second holder each time the holders complete an orbit, a rod having an end portion pivotally connected for relative tiltable movement in the bore of the second holder and having a projecting portion extending slidably through the bore of the first holder to maintain the holders in facing relationship with one another during their orbital travel, and means in the second holder engaging said rod for maintaining a selected tilted relationship between the holder and rod to maintain proper shearing engagement of the knives.

3. Cut-off apparatus comprising a first holder having a transverse bore near one end, a second holder having a transverse bore of larger diameter than the bore of the first holder aligned with the latter, a knife blade in each of said holders, means including a first gear for causing orbital movement of said first holder in a planetary path around the axis of said first gear, means including a second gear meshing with said first gear for causing orbital movement of said second holder in a planetary path around the axis of said second gear, the knife blades being so disposed in the holders and the planetary paths being so related to one another that the knife blade of the first holder has shearing engagement with the knife blade of the second holder each time the holders complete an orbit, a rod having an end portion pivotally connected for relative tiltable movement in the bore of the second holder and having a projecting portion extending slidably through the bore of the first holder to maintain the holders in facing relationship with one another during their orbital travel, and means in the second holder engaging opposite sides of said rod above and below its pivotal connection for maintaining a selected tilted relationship between the holder and rod to maintain proper shearing engagement of the knives.

4. Apparatus for producing substantially parallel movement of cooperating instruments comprising a first holder, a second holder, an instrument in each of said holders, means including a first gear for causing orbital movement of said first holder in a planetary path around the axis of said first gear, means including a second gear meshing with said first gear for causing orbital movement of said second holder in a planetary path around the axis of said second gear, the instruments being so disposed in the holders and the planetary paths being so related to one another that the instrument of the first holder has operating engagement with the instrument of the second holder each time the holders complete an orbit, means for maintaining the holders in facing relationship with one another during their orbital travel, means for rotatably varying said facing relationship of one of said holders with respect to the other for instrument adjustment purposes, and means for adjustably maintaining said varied position.

5. Apparatus for producing substantially parallel movement of cooperating instruments comprising a first holder, a second holder, an instrument in each of said holders, means including a first gear for causing orbital movement of said first holder in a planetary path around the axis of said first gear, means including a second gear meshing with said first gear for causing orbital movement of said second holder in a planetary path around the axis of said second gear, the instruments being so disposed in the holders and the planetary paths being so related to one another that the instrument of the first holder has operating engagement with the instrument of the second holder each time the holders complete an orbit, means including a relatively slidable connection between said holders for maintaining the holders in facing relationship with one another during their orbital travel, means for rotatably varying said facing relationship of one of said holders with respect to the other for instrument adjustment purposes, and means for adjustably maintaining said varied position.

References Cited by the Examiner
UNITED STATES PATENTS

| | | | |
|---|---|---|---|
| 2,420,983 | 5/1947 | Salfisberg | 53—180 |
| 2,827,742 | 3/1958 | Bursak | 43—180 X |
| 2,962,843 | 12/1960 | Hoelzer et al. | 156—583 X |
| 3,128,548 | 4/1964 | Zelisko | 83—328 X |
| 3,128,660 | 4/1964 | Gaubert | 83—328 X |
| 3,149,516 | 9/1964 | Caldwell et al. | 83—328 |

WILLIAM W. DYER, JR., *Primary Examiner.*

J. M. MEISTER, *Assistant Examiner.*